US010557473B2

(12) United States Patent
Thornton et al.

(10) Patent No.: US 10,557,473 B2
(45) Date of Patent: Feb. 11, 2020

(54) CONTROL SYSTEM AND METHOD FOR CENTRIFUGAL COMPRESSOR

(71) Applicant: DANFOSS A/S, Nordborg (DK)

(72) Inventors: William Turner Thornton, Winter Haven, FL (US); Lin Sun, Tallahassee, FL (US)

(73) Assignee: DANFOSS A/S (DK)

( * ) Notice: Subject to any disclaimer, the term of this patent is extended or adjusted under 35 U.S.C. 154(b) by 534 days.

(21) Appl. No.: 15/120,699

(22) PCT Filed: Feb. 20, 2014

(86) PCT No.: PCT/US2014/017295
§ 371 (c)(1),
(2) Date: Aug. 22, 2016

(87) PCT Pub. No.: WO2015/126393
PCT Pub. Date: Aug. 27, 2015

(65) Prior Publication Data
US 2017/0074275 A1   Mar. 16, 2017

(51) Int. Cl.
*F04D 27/02*   (2006.01)
*F04D 27/00*   (2006.01)
(Continued)

(52) U.S. Cl.
CPC ......... *F04D 27/0253* (2013.01); *F04D 17/12* (2013.01); *F04D 27/001* (2013.01);
(Continued)

(58) Field of Classification Search
CPC .. F04D 27/0253; F04D 27/001; F04D 27/002; F04D 27/246; F04D 27/0261;
(Continued)

(56) References Cited

U.S. PATENT DOCUMENTS 3,741,676 A * 6/1973 Silvern ................ F04D 25/163
415/11
5,576,587 A   11/1996 Takahashi et al.
(Continued)

FOREIGN PATENT DOCUMENTS

CH          237682 A      5/1945
CN         102803736     11/2012
(Continued)

OTHER PUBLICATIONS

International Search Report and Written Opinion for International Application No. PCT/US2014/017295 dated Jun. 10, 2014.
(Continued)

*Primary Examiner* — Richard A Edgar
*Assistant Examiner* — Maxime M Adjagbe
(74) *Attorney, Agent, or Firm* — Carlson, Gaskey & Olds, P.C.

(57) ABSTRACT

This disclosure relates to a control system and method for the centrifugal compressor. The system, for example, includes a controller configured command an adjustment of at least one of (1) a flow regulator and (2) a speed of a shaft in order to provide safe, efficient compressor operation. Centrifugal compressors are used to circulate refrigerant in a chiller via a refrigerant loop. Centrifugal compressors operate efficiently before reaching a condition known as surge.

20 Claims, 3 Drawing Sheets

(51) Int. Cl.
　　　*F04D 29/058*　　(2006.01)
　　　*F25B 1/053*　　(2006.01)
　　　*F04D 17/12*　　(2006.01)
　　　*F04D 29/44*　　(2006.01)
　　　*F25B 1/10*　　(2006.01)

(52) U.S. Cl.
　　　CPC ....... *F04D 27/0261* (2013.01); *F04D 29/058* (2013.01); *F04D 29/444* (2013.01); *F25B 1/053* (2013.01); *F25B 1/10* (2013.01)

(58) Field of Classification Search
　　　CPC .... F04D 29/444; F04D 29/058; F04D 29/462; F04D 29/464; F04D 17/12; F04D 27/0207; F04D 27/0215; F04D 27/023; F04D 27/0238; F25B 1/053
　　　See application file for complete search history.

(56) References Cited

U.S. PATENT DOCUMENTS

| | | |
|---|---|---|
| 5,669,756 A | 9/1997 | Brasz et al. |
| 5,807,071 A | 9/1998 | Brasz et al. |
| 5,924,847 A | 7/1999 | Scaringe et al. |
| 6,581,399 B2 | 6/2003 | Benedict et al. |
| 2002/0184905 A1 | 12/2002 | Benedict et al. |
| 2005/0076656 A1 | 4/2005 | Bodell et al. |
| 2007/0189905 A1* | 8/2007 | Dinsdale ................ F04D 17/12 417/2 |
| 2010/0005763 A1 | 1/2010 | Bloom |
| 2010/0170274 A1 | 7/2010 | Ueda |
| 2010/0263391 A1 | 10/2010 | Tetu et al. |
| 2011/0048046 A1 | 3/2011 | Sommer et al. |
| 2013/0156544 A1 | 6/2013 | Sishtla |

FOREIGN PATENT DOCUMENTS

| | | |
|---|---|---|
| JP | S54128808 A | 10/1979 |
| JP | S569696 A | 1/1981 |
| JP | H01227900 A | 9/1989 |
| JP | 2012528989 A | 11/2012 |
| JP | 2013122331 A | 6/2013 |
| WO | 2010141815 A2 | 12/2010 |
| WO | 2013039492 A1 | 3/2013 |
| WO | 2013112122 A2 | 8/2013 |
| WO | 2013133832 A2 | 9/2013 |

OTHER PUBLICATIONS

Vishnu Sishtla, Performance Of Centrifugal Compressors With Variable Vaned Diffuser, Purdue Paper, 1996.
Extended European Search Report for European Patent Application No. 14882987.2, completed Sep. 20, 2017.

* cited by examiner

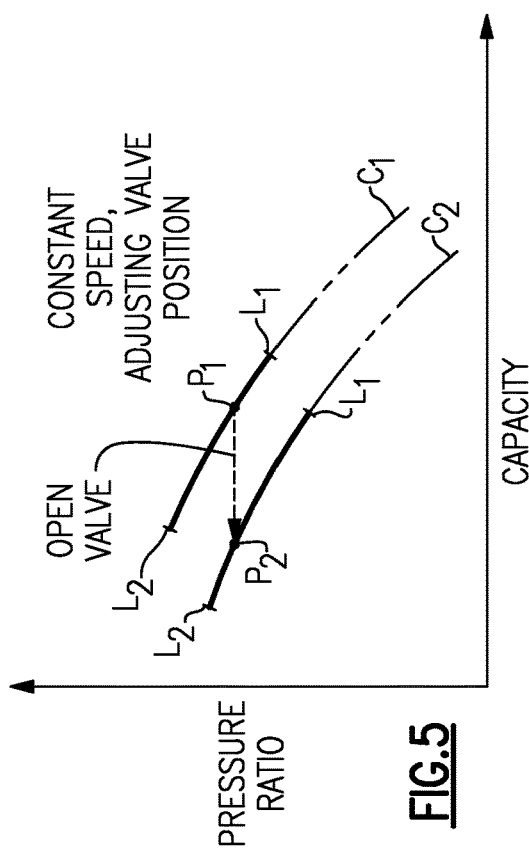
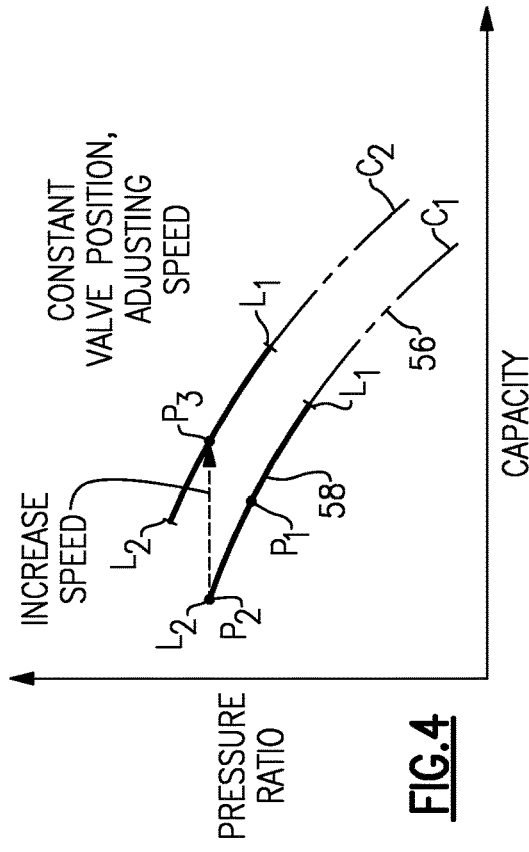
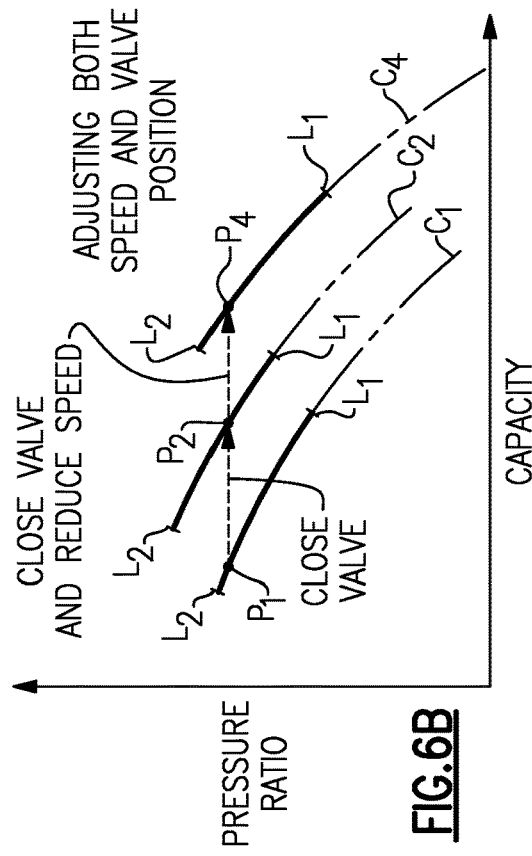
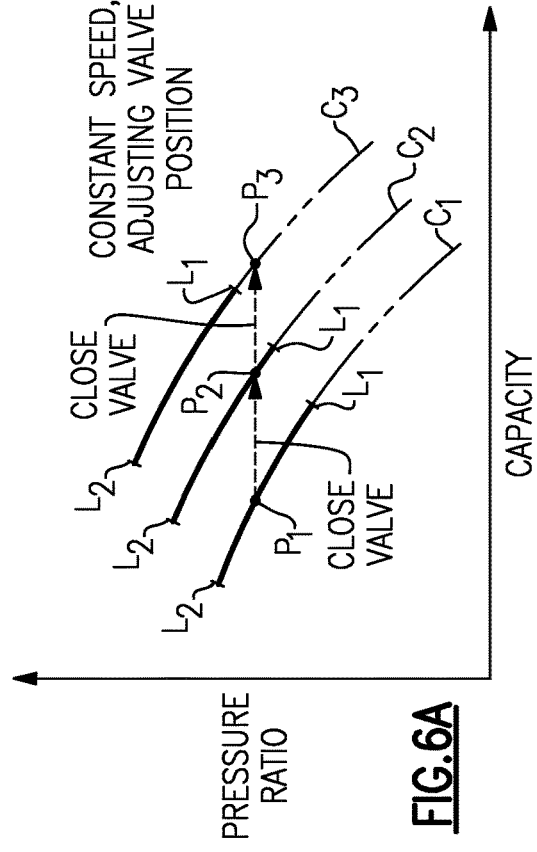

CONTROL SYSTEM AND METHOD FOR CENTRIFUGAL COMPRESSOR

BACKGROUND

Centrifugal compressors are used to circulate refrigerant in a chiller via a refrigerant loop. Centrifugal compressors operate efficiently before reaching a condition known as surge. During surge, however, the compressor experiences too low a flow rate for a given pressure ratio, and may experience flow reversal.

In one example compressor, an impeller is supported on a rotor shaft by magnetic bearings. Vibrations detected by the magnetic bearing control systems have been used to detect instability in the fluid caused by stall and surge conditions. These vibrations have been used to regulate the flow through the impeller by adjusting inlet guide vanes.

In another example, pressures are measured at either side of an impeller. An undesired pressure fluctuation at a given operating condition indicates flow instability, which generates shaft instability. In this example, a position of a variable geometry diffuser is adjusted to regain flow stability.

SUMMARY

This disclosure relates to a control system and method for the centrifugal compressor. The system, for example, includes a controller configured command an adjustment of at least one of (1) a flow regulator and (2) a speed of a shaft in order to provide safe, efficient compressor operation.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 4 graphically represents a speed adjustment while maintaining valve position.

FIG. 5 graphically represents a valve position adjustment while maintaining speed.

FIG. 6A graphically represents a series of valve position adjustments made while maintaining speed.

FIG. 6B graphically represents a series of valve position adjustments, one of which is made with a speed adjustment.

DETAILED DESCRIPTION

Figure 1:
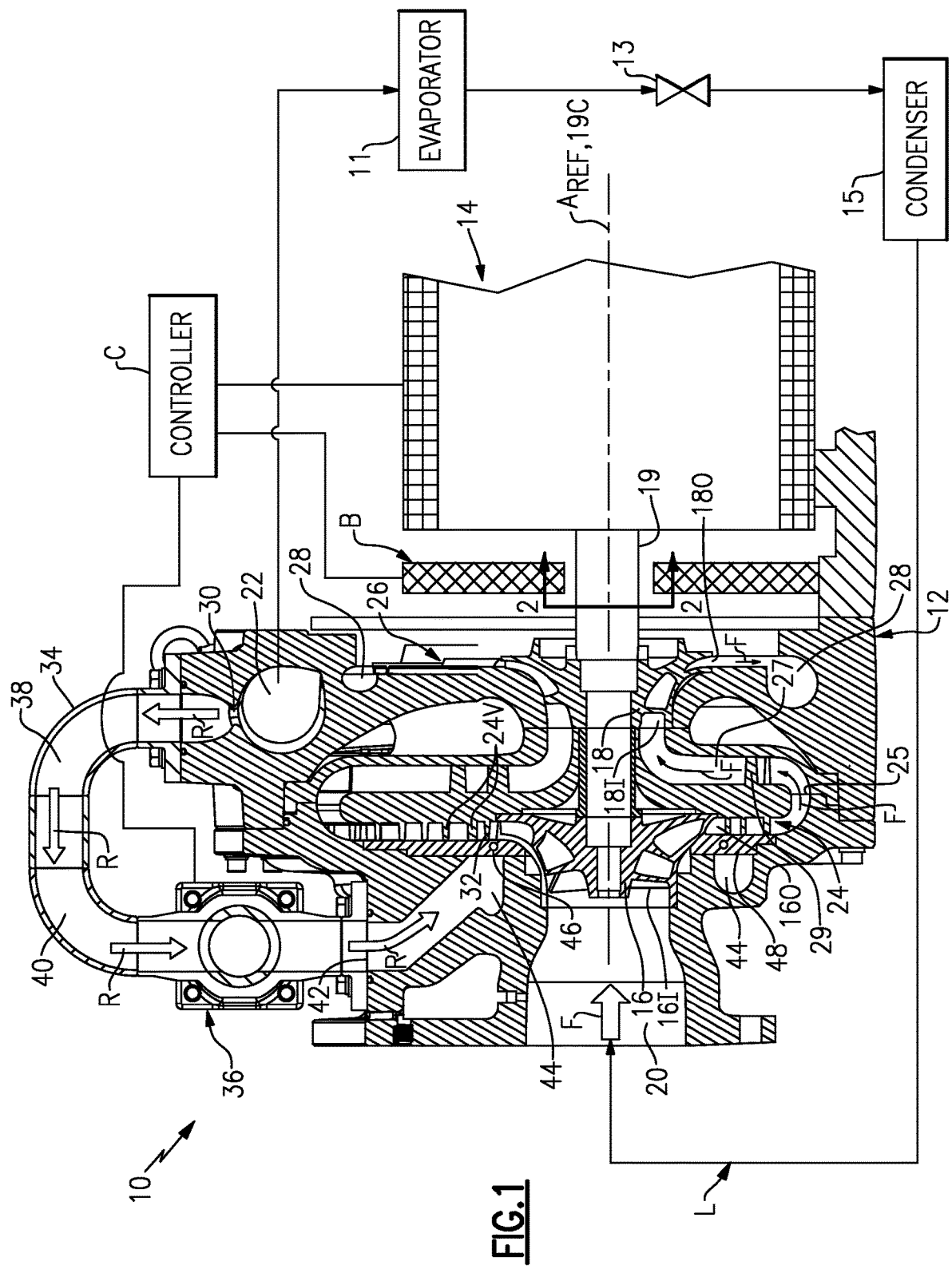
FIG. 1 is a highly schematic view of a refrigerant compressor.

FIG. 1 illustrates a centrifugal refrigerant compressor 10 ("compressor 10") for circulating a refrigerant. The compressor 10 is described in detail in co-pending U.S. application Ser. No. 14/096,395, filed Dec. 4, 2013, the entirety of which is herein incorporated by reference. This disclosure is not limited to all of the details of the compressor 10 illustrated in FIG. 1, nor is the compressor 10 limited to the description in the '395 application. Rather, FIG. 1 and the '395 application describe and show one example of a compressor that comes within the scope of this disclosure.

As mentioned, the compressor 10 is a refrigerant compressor. Example refrigerants include chemical refrigerants, such as R-134a and the like. Further, the compressor 10 may be in fluid communication with a refrigeration loop L. Refrigeration loops L are known to include an evaporator 11, an expansion device 13, and a condenser 15.

The compressor 10 includes a housing 12, which encloses an electric motor 14. The housing 12 may comprise one or more pieces. The electric motor 14 rotationally drives at least one impeller to compress refrigerant. The motor 14 may be driven by a variable frequency drive. The compressor 10 includes a first impeller 16 and a second impeller 18, each of which is connected to the motor 14 via a shaft 19. While two impellers are illustrated, this disclosure extends to compressors having additional, or fewer, impellers.

The shaft 19 is rotatably supported by a bearing assembly B, which in this example is a magnetic bearing assembly. The bearing assembly B includes a bearing power source, and a sensing element configured to determine a position of the shaft 19. In one example, the sensing element includes a current sensor configured to measure a current provided from the bearing power source to the magnetic bearing.

In some operating conditions, a centerline 19C of the shaft 19 is co-axial with a reference axis $A_{REF}$. In other conditions, such as when the compressor 10 approaches surge, the centerline 19C deviates from the reference axis $A_{REF}$. The bearing assembly B is configured to sense this deviation, and report the position of the centerline 19C to a controller C, as will be described below. The controller C may be any known type of controller including memory, hardware, and software. The controller C is configured to store instructions, and to provide instructions to the various components of the compressor 10 (including the motor 14, and the bearing assembly B). The controller C may be provided by one or more components.

The housing 12 establishes a main refrigerant flow path F. In particular, the housing 12 establishes an outer boundary for the main refrigerant flow path F. A first, or main, flow of refrigerant is configured to flow along the main refrigerant flow path F between a compressor inlet 20 and a compressor outlet 22. In this example, there are no inlet guide vanes disposed at the compressor inlet 20. The lack of inlet guide vanes reduces the number of mechanical parts in the compressor 10, which would require maintenance and/or replacement after prolonged use.

From left to right in FIG. 1, the main refrigerant flow path F begins at the compressor inlet 20, where refrigerant is drawn toward the first impeller 16. The first impeller 16 is provided in the main refrigerant flow path F, and is arranged upstream of the second impeller 18 relative to the main refrigerant flow path F. The first impeller 16 includes an inlet 16I arranged axially, generally parallel to the reference axis $A_{REF}$, and an outlet 16O arranged radially, generally perpendicular to the reference axis $A_{REF}$.

Immediately downstream of the outlet 16O, in this example, is a first diffuser 24. The first diffuser 24 includes a plurality of vanes 24V. In this example, the vanes 24V are stationary vanes. That is, the relative orientation of vanes 24V is not adjustable during operation of the compressor 10, and the flow path created between the vanes 24V is not adjustable during operation of the compressor 10. While this disclosure is not limited to stationary vaned diffusers, using a diffuser with stationary vanes has the advantage of reducing the number of mechanical parts in the compressor 10 (which, again, would need to be serviced and/or replaced after a period of use). Further, avoiding a variable geometry diffuser may have the benefit of eliminating leakage flow that is commonly associated with variable geometry diffusers.

The main refrigerant flow path F extends through the first diffuser 24 in a direction generally radially away from the reference axis $A_{REF}$. Next, the main refrigerant flow path F turns 180 degrees in a cross-over bend 25, and flows radially inward through a return channel 27 having deswirl vanes 29 toward the second impeller 18. Like the first impeller 16, the second impeller 18 includes an axially oriented inlet 18I and a radially oriented outlet 18O. A second diffuser 26 is arranged downstream of the second impeller 18. In this example, the second diffuser 26 does not include stationary vanes, however, it may include vanes. An outlet volute 28 is provided downstream of the second diffuser 26. The outlet volute 28 generally spirals about the reference axis $A_{REF}$ and leads to the compressor outlet 22.

The compressor 10, in this example, includes a recirculation flow path R configured to recirculate a portion of the refrigerant (i.e., a "second flow" of refrigerant) from the main refrigerant flow path F from a first location 30 to a second location 32 upstream, relative to the main refrigerant flow path F, of the first location 30. In this example, the first location 30 is adjacent the compressor outlet 22, and the second location 32 is located downstream of the first impeller 16, as will be discussed below. The first and second locations 30, 32 may be provided at other locations, however, without departing from the scope of this disclosure. Alternative candidates for the first location 30 are the cross-over bend 25, or a location within the return channel 27. The second location 32 may alternatively be provided at the inlet of the second diffuser 26.

The recirculation flow path R is provided, in part, by a recirculation line 34. In this example, the recirculation line 34 extracts its flow from outlet volute 28, at which point the flow of fluid is swirl-free. This in contrast to extracting the flow circumferentially at the exit of the diffuser, in which case multiple passages separated by deswirl vanes are needed to maintain the pressure required for injection of the flow through the recirculation nozzles 46. Without deswirl vanes, conservation of angular momentum causes an increase in velocity and a decrease in pressure due to the smaller radius of the recirculation nozzles 46. This reduction in static pressure limits the recirculation flow R as a result of the reduced pressure differential over the recirculation nozzles 46.

The recirculation flow path R further includes a flow regulator, or valve, 36. In this example, the flow regulator 36 is provided external to the housing 12, in the recirculation line 34. This allows for ease of replacement and installation of the flow regulator 36. The flow regulator 36 may be any type of device configured to regulate a flow of refrigerant, including mechanical valves, such as butterfly, gate or ball valves with electrical or pneumatic control. The flow regulator 36 may include an actuator operable to position a valve in response to instructions from the controller C.

The recirculation flow path R initially extends radially outward, in a direction generally normal to the reference axis $A_{REF}$, from the first location 30 along the main refrigerant flow path F to a first bend 38 in the recirculation line 34. The recirculation flow path R then extends axially, from right to left in FIG. 1 (and generally parallel to the reference axis $A_{REF}$), from the first bend 38 to a second bend 40, where the recirculation flow path R then turns radially inward toward the reference axis $A_{REF}$. In this example, the flow regulator 36 is provided in the recirculation flow path R downstream of the second bend 40. While the recirculation flow path R is illustrated in a particular manner, the recirculation flow path R may be arranged differently.

Downstream of the flow regulator 36, the recirculation flow path R enters the housing 12 at an entrance 42 to a recirculation volute 44. A recirculation volute 44 is not required, however. In other examples, a plenum may be used. However, when a recirculation volute 44 is used, the velocity (kinetic energy) of the fluid in the recirculation line 34 is maintained entering the recirculation volute 44 while it is lost entering a plenum. As a result, the recirculation volute 44 results in a more effective flow recirculation system.

The recirculation volute 44 spirals around the reference axis $A_{REF}$, and is in communication with a plurality of recirculation nozzles 46. Refrigerant within the recirculation flow path R is introduced into the main refrigerant flow path F via the recirculation nozzles 46 between adjacent vanes 24V. The detail of the recirculation nozzles 46 and the vanes 24V is discussed in U.S. application Ser. No. 14/096,395, which, again, has been incorporated herein by reference.

The flow regulator 36 may be selectively positioned, in response to instructions from the controller C, to remove a portion of the refrigerant within the main refrigerant flow path F, at the first location 30, and to inject (or, reintroduce) that removed portion of refrigerant back into the main refrigerant flow path F via the recirculation flow path R.

The injection of refrigerant from the recirculation flow path R increases the stability of operation of the compressor 10 in part-load conditions by allowing the downstream elements (e.g., the first diffuser 24, return channel 27, the second impeller 18, and the second diffuser 26) to experience flows closer to their optimum range. In turn, this extends the efficient operating range of the compressor 10 to lower, part-load operating conditions, which reduces the likelihood of a surge condition. Further, and as mentioned above, the compressor 10 may do so without the need for inlet guide vanes or variable geometry diffusers, which increases the reliability of the compressor 10.

Figure 2A:
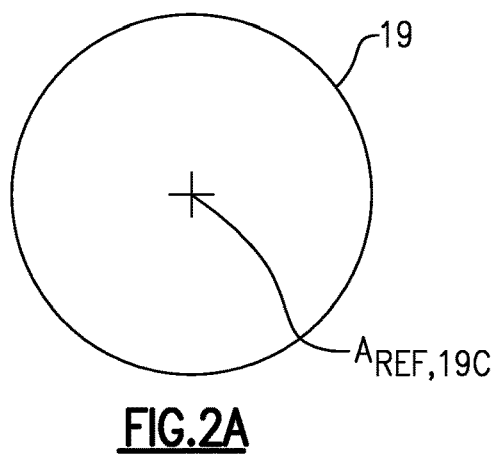
FIG. 2A is a view along line 2-2 from FIG. 1, and illustrates the shaft positioned along a reference axis.

As noted above, the centerline 19C of the shaft 19 rotates about a reference axis $A_{REF}$ during some operating conditions (FIG. 2A). While the shaft 19 is stable in these conditions, the compressor 10 operates relative inefficiently. While surge is generally to be avoided, the compressor 10 is most efficient as it nears surge. Before surge occurs, fluctuations in the shaft 19 due to instability can be seen in signals from position sensors associated with the bearing assembly B.

Figure 2B:
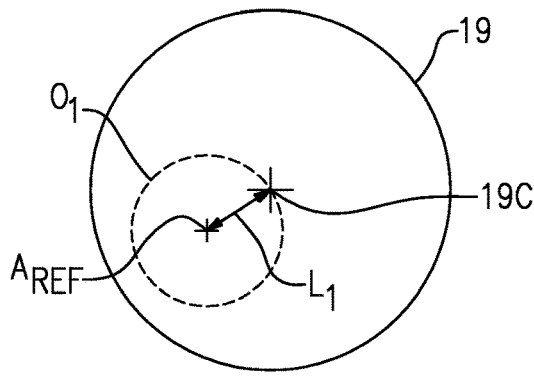
FIG. 2B is a view along line 2-2, and illustrates the shaft at a lower limit.
Figure 2C:
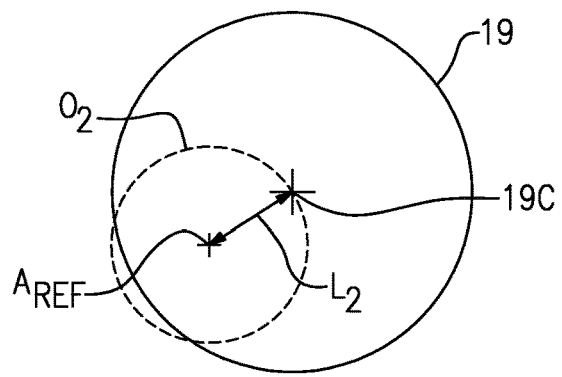
FIG. 2C is a view along line 2-2, and illustrates the shaft at an upper limit.

As the compressor 10 approaches surge, the centerline 19C of the shaft 19 begins to deviate from the reference axis $A_{REF}$. FIGS. 2B-2C illustrate the balance between inefficient compressor operation (associated with $L_1$) and surge (associated with $L_2$).

In FIG. 2B, the centerline 19C of the shaft 19 has deviated from the reference axis $A_{REF}$ by a first distance $L_1$. This first distance $L_1$ is referred to herein as a lower limit $L_1$. At the lower limit $L_1$, the shaft 19 exhibits a first orbit $O_1$ about the reference axis $A_{REF}$.

In FIG. 2C, the centerline 19C of the shaft 19 is spaced a second distance $L_2$ from the reference axis $A_{REF}$. The second distance $L_2$ will be referred to herein as an upper limit $L_2$. At the upper limit $L_2$, the shaft 19 exhibits a second, larger orbit $O_2$ about the reference axis $A_{REF}$ than the first orbit $O_1$. While the reference axis $A_{REF}$ and the centerline 19C of the shaft 19 are referred to herein, this disclosure extends to applications where the position of the shaft 19 is monitored in different ways, such as by monitoring the position of the outer surface of the shaft 19.

The compressor 10 is within an efficient and safe operating range when the centerline 19C of the shaft 19 is within a range between $L_1$ and $L_2$. That is, when the centerline 19C is provided at a distance greater than or equal to $L_1$, and less than or equal to $L_2$, relative to the reference axis $A_{REF}$. Below $L_1$, the compressor 10 operates inefficiently. Above $L_2$, the compressor may experience surge.

In one example, the lower and upper limits $L_1$, $L_2$ are predetermined values that are stored and used by the controller C. The lower and upper limits $L_1$, $L_2$ are determined by the results of experimental tests and observation. Further, the lower and upper limits $L_1$, $L_2$ can be adjusted during operation of the compressor, as needed, and depending on the particular application. In some examples, the lower and upper limits $L_1$, $L_2$ are relatively small in scale, on the order of fractions of millimeters. For instance, the lower limit $L_1$ may be about 0.05 mm, and the upper limit $L_2$ may be about 0.1 mm.

FIG. 1 illustrates a front radial magnetic bearing, which is part of the bearing assembly B, and is adjacent the impellers 16, 18. Other magnetic bearings within the assembly B, such as a rear magnetic bearing, could be used to monitor the position of the shaft 19. However, the front radial magnetic bearing may have the advantage of being more sensitive to movements of the impellers 16, 18 because of its close proximity. Additionally, this disclosure is not limited to compressors that monitor shaft position using magnetic bearings. Other methods of detecting shaft position come within the scope of this disclosure.

Figure 3:
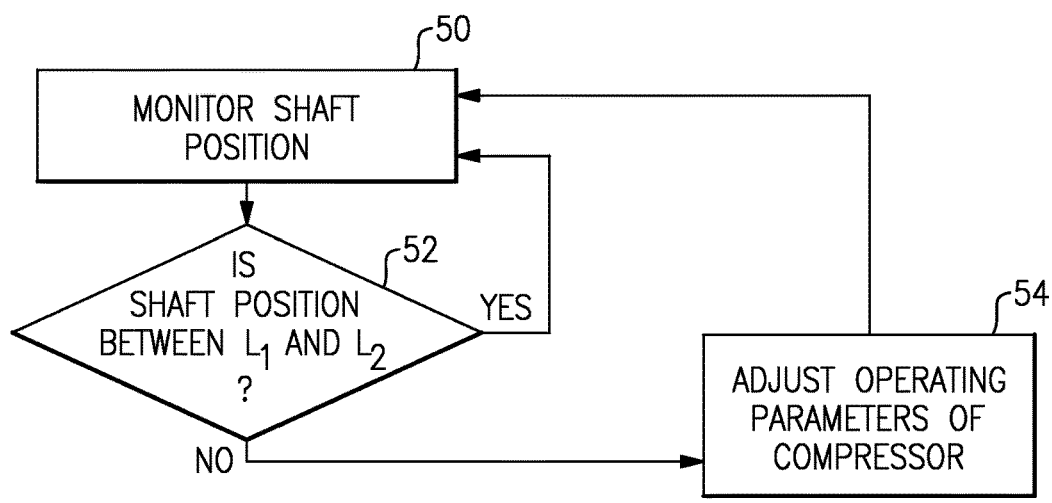
FIG. 3 is a flow chart representative of an example method.

One example method according to this disclosure is illustrated in FIG. 3. During operation of the compressor 10, the position of the shaft 19 is monitored, at 50. In this example, as noted above, the bearing assembly B is configured to monitor the location of the centerline 19C of this shaft 19 at a point adjacent the front radial magnetic bearing.

The bearing assembly B reports the position of the shaft 19 to the controller C. The controller C then determines, at 52, whether the centerline 19C is within the range between $L_1$ and $L_2$. If the position of the shaft 19 is within the accepted range, the controller C continues to monitor the shaft 19 position. If not, certain operating parameters of the compressor 10 are adjusted, at 54. By using the bearing assembly B to monitor shaft position, and by considering shaft position as opposed to making pressure measurements, no additional sensing devices (like pressure sensors and proximity sensors) are needed.

FIGS. 4-6B illustrate various examples of adjustments, namely adjusting the flow regulator 36 and/or the rotational speed of the shaft 19. While reference herein is made to "speed" or "shaft speed," it should be understood that the rotational speed of the shaft 19 is directly proportional to, if not the same as, the rotational speed of the impellers 16, 18, as well as the rotational speed of the motor 14. In some instances, this "speed" is referred to as "compressor speed."

FIGS. 4-6B include several example operational curves of the compressor 10, showing pressure ratio (Y-axis) versus capacity (X-axis). Each of the curves in FIGS. 4-6B have a portion representative of an inefficient operating range 56, illustrated as a dashed line, wherein the position of the centerline 19C of the shaft 19 would be below $L_1$. The curves also include an efficient operating range 58, illustrated as a solid line, wherein the centerline 19C of the shaft 19 would be within a range between $L_1$ and $L_2$.

FIG. 4 illustrates two operational curves, $C_1$ and $C_2$. In FIG. 4, the position of the flow regulator 36 is held constant. In one example, the compressor 10 may be operating within the efficient operating range 58, at point $P_1$. Due to some condition within the refrigerant loop L, such as an increase in temperature within the condenser 15, the pressure ratio required of the system may increase.

In response to the increased pressure ratio, the compressor 10 moves along curve $C_1$ from point $P_1$ to point $P_2$. In order to avoid surge, as the shaft 19 approaches $L_2$, the rotational speed of the shaft 19 is increased (by, for example, 5%), which horizontally shifts the operational curve of the shaft to curve $C_2$. This increase in rotational speed of the shaft 19 has the compressor 10 operating at a point $P_3$, providing the new, higher pressure ratio, within an efficient operating range 58 along the curve $C_2$.

Another operational adjustment is represented in FIG. 5. In FIG. 5, the rotational speed of the shaft 19 is held constant. While operating at point $P_1$, the capacity required of the compressor 10 may decrease. In this instance, the flow regulator 36 is opened relative to its position at point $P_1$. That is, for the sake of illustrating an example, if the flow regulator 36 is 30% open at point P1, the flow regulator 36 would be adjusted to being 35% open at point $P_2$.

By opening the flow regulator 36 and maintaining a constant shaft speed, the compressor 10 now operates along a new, second curve $C_2$. In this example, the compressor 10 operates at a point $P_2$ along the curve $C_2$, which, as shown in FIG. 5, is within the efficient operating range 58.

FIGS. 6A-6B illustrate an example wherein the compressor capacity increases. In one example, the compressor 10 initially operates at point $P_1$ along curve $C_1$. To increase capacity, the flow regulator 36 is closed relative to its position at point $P_1$. With this adjustment, the compressor 10 now operates at point $P_2$ along a new, second curve $C_2$.

To further increase the capacity of the compressor 10, while holding shaft speed constant, the flow regulator 36 is further closed relative to the position at point $P_2$, such that the compressor operates at point $P_3$ along a third curve $C_3$ (FIG. 6A). As illustrated, point $P_3$ is below $L_1$ and, therefore, while operating safely, the compressor 10 is operating relatively inefficiently.

FIG. 6B illustrates a similar operational adjustment relative to FIG. 6A, however, in FIG. 6B, both shaft speed and flow regulator position are adjusted when increasing capacity from point $P_2$. In FIG. 6B, the flow regulator 36 is closed relative to its $P_2$ position, just as in the FIG. 6A example, but the rotational speed of the shaft 19 is also reduced relative to its speed at point $P_2$. With these two adjustments, the compressor 10 now operates at point $P_4$ along a fourth curve $C_4$. Curve $C_4$ is shifted along the Y-axis, relative to curve $C_3$ by virtue of the speed reduction. With this combination of closing the flow regulator 36 and reducing speed, the compressor 10 now provides an increased capacity within an efficient operating range 58.

As can be seen from the above, the specifically contemplated operating parameters that may be adjusted, at 54, include opening and closing the flow regulator 36, and adjusting the rotational speed of the shaft 19. Depending on the particular circumstances, the flow regulator 36 may be adjusted in combination with an adjustment to the speed of the shaft 19 (as in FIG. 6B). While flow regulator position and shaft speed are discussed above, this disclosure applies to other operating parameters that may be adjusted.

Although the different examples have the specific components shown in the illustrations, embodiments of this disclosure are not limited to those particular combinations.

It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A centrifugal refrigerant compressor control system comprising:
a first impeller and a second impeller connected to a shaft, the first and second impellers provided in a main refrigerant flow path;
a flow regulator provided in a recirculation flow path, wherein the recirculation flow path is provided such that flow is extracted from the main refrigerant flow path downstream of the second impeller and is reintroduced into the main refrigerant flow path downstream of the first impeller;
a magnetic bearing system supporting the shaft, the magnetic bearing system including a sensing element configured to produce an output relating to a shaft position; and
a controller configured to receive the output from the sensing element, and to command an adjustment of the flow regulator in response to the output from the sensing element.

2. The system as recited in claim 1, wherein the output from the sensing element includes a location of a centerline of the shaft relative to a reference axis.

3. The system as recited in claim 2, wherein an adjustment is commanded when the location of the centerline of the shaft is outside an efficient operating range.

4. The system as recited in claim 3, wherein the efficient operating range includes a lower limit and an upper limit, the lower and upper limits being distances from the reference axis.

5. The system as recited in claim 1, wherein flow is reintroduced into the main refrigerant flow path adjacent a first vaned diffuser downstream of the first impeller.

6. The system as recited in claim 5, wherein the first vaned diffuser includes stationary vanes, and wherein there are no inlet guide vanes disposed at an inlet of the compressor.

7. The system as recited in claim 1, wherein the flow regulator includes an actuator and a mechanical valve.

8. The system as recited in claim 1, comprising a variable speed motor configured to rotationally drive the shaft.

9. The system as recited in claim 1, wherein the sensing element includes at least one position sensor.

10. The system as recited in claim 1, comprising a bearing power source, and the sensing element includes a current sensor configured to measure a current provided from the bearing power source to a magnetic bearing adjacent the shaft.

11. The system as recited in claim 1, wherein the first impeller is closer to a compressor inlet than the second impeller.

12. The system as recited in claim 8, wherein the first and second impellers are on a common side of the variable speed motor.

13. A method of controlling a centrifugal refrigerant compressor comprising:
determining a position of a shaft supporting a first impeller and a second impeller, the first and second impellers being provided in a main refrigerant flow path;
determining whether the shaft position is within an efficient operating range; and
adjusting a flow regulator provided in a recirculation flow path based on the determined shaft position, wherein the recirculation flow path is provided such that flow is extracted from the main refrigerant flow path downstream of the second impeller and is reintroduced into the main refrigerant flow path downstream of the first impeller.

14. The method as recited in claim 13, wherein the position of the shaft is determined by determining a location of a centerline of the shaft relative to a reference axis.

15. The method as recited in claim 13, wherein the efficient operating range includes a lower limit and an upper limit, the lower and upper limits being distances from the reference axis.

16. The method as recited in claim 13, wherein the step of determining the position of the shaft is performed using at least one of a bearing position sensor and a bearing current sensor.

17. The method as recited in claim 13, wherein, when changing a capacity of the compressor, the flow regulator is adjusted and the rotational speed of the shaft is adjusted.

18. The method as recited in claim 17, wherein, when increasing the capacity of the compressor, the flow regulator is closed and the rotational speed of the shaft is reduced.

19. The method as recited in claim 13, wherein, when decreasing a capacity of the compressor, the flow regulator is opened.

20. The method as recited in claim 13, wherein, in response to an increased pressure ratio, a rotational speed of the shaft is increased.

* * * * *